United States Patent
Palotas

(10) Patent No.: US 10,220,304 B2
(45) Date of Patent: Mar. 5, 2019

(54) BOOLEAN/FLOAT CONTROLLER AND GESTURE RECOGNITION SYSTEM

(71) Applicant: MICROSOFT TECHNOLOGY LICENSING, LLC, Redmond, WA (US)

(72) Inventor: Mike Palotas, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 27 days.

(21) Appl. No.: 14/053,417

(22) Filed: Oct. 14, 2013

(65) Prior Publication Data

US 2015/0105159 A1  Apr. 16, 2015

(51) Int. Cl.
| | | |
|---|---|---|
| A63F 13/00 | (2014.01) | |
| A63F 13/213 | (2014.01) | |
| G06F 3/01 | (2006.01) | |
| G06F 3/02 | (2006.01) | |
| A63F 13/215 | (2014.01) | |
| G06F 3/033 | (2013.01) | |
| G06F 9/54 | (2006.01) | |

(52) U.S. Cl.
CPC .......... *A63F 13/213* (2014.09); *A63F 13/215* (2014.09); *G06F 3/011* (2013.01); *G06F 3/016* (2013.01); *G06F 3/017* (2013.01); *G06F 3/0227* (2013.01); *G06F 3/033* (2013.01); *G06F 9/541* (2013.01)

(58) Field of Classification Search
CPC ................................ G06F 3/016; G06F 3/017
See application file for complete search history.

(56) References Cited

U.S. PATENT DOCUMENTS

| | | | | |
|---|---|---|---|---|
| 5,711,708 A | * | 1/1998 | Fischer | 463/36 |
| 6,077,163 A | * | 6/2000 | Walker et al. | 463/26 |
| 6,146,273 A | * | 11/2000 | Olsen | 463/27 |
| 6,147,696 A | * | 11/2000 | Smith et al. | 345/533 |
| 6,315,662 B1 | * | 11/2001 | Jorasch et al. | 463/20 |
| 8,296,151 B2 | | 10/2012 | Klein et al. | |

(Continued)

FOREIGN PATENT DOCUMENTS

| | | |
|---|---|---|
| CN | 102184020 A | 9/2011 |
| CN | 102542160 A | 7/2012 |
| WO | 2013/039586 A1 | 3/2013 |

OTHER PUBLICATIONS

"Second Written Opinion Issued in PCT Application No. PCT/US2014/059987", dated Sep. 11, 2015, 6 Pages.

(Continued)

*Primary Examiner* — David L Lewis
*Assistant Examiner* — Eric M Thomas
(74) *Attorney, Agent, or Firm* — Alleman Hall Creasman & Tuttle LLP

(57) ABSTRACT

A system and method are disclosed for providing input to a software application such as a gaming application. The inputs may be received from one or both of a hand-held controller and a NUI system accepting gestural inputs. In an example, a gesture and controller API receives skeletal pose data from the NUI system and converts that data to Boolean or floating point data. In this way, data from both the controller and the NUI system may be exposed to the software application as easily consumable data in the same format.

20 Claims, 7 Drawing Sheets

(56) References Cited

U.S. PATENT DOCUMENTS

| | | | |
|---|---|---|---|
| 2002/0045475 A1* | 4/2002 | Glavich et al. | 463/20 |
| 2002/0077534 A1 | 6/2002 | DuRousseau | |
| 2002/0198042 A1* | 12/2002 | Webb et al. | 463/20 |
| 2003/0203753 A1* | 10/2003 | Muir et al. | 463/20 |
| 2007/0259717 A1 | 11/2007 | Mattice et al. | |
| 2008/0300055 A1* | 12/2008 | Lutnick | G06F 3/011 463/39 |
| 2010/0199231 A1* | 8/2010 | Markovic | H04N 7/18 715/863 |
| 2010/0306712 A1* | 12/2010 | Snook | G06K 9/00342 715/863 |
| 2011/0289455 A1* | 11/2011 | Reville | G06F 3/011 715/830 |
| 2012/0157203 A1 | 6/2012 | Latta et al. | |
| 2013/0278631 A1* | 10/2013 | Border | G02B 27/017 345/633 |
| 2014/0149916 A1* | 5/2014 | Manoff | G06F 3/0488 715/781 |

OTHER PUBLICATIONS

"International Search Report and Written Opinion Received for PCT Application No. PCT/US2014/059987", dated Feb. 9, 2015, 11 Pages.

Hadjiminas, "Be the Controller: A Kinect Tool Kit for Video Game Control—Recognition of Human Motion Using Skeletal Relational Angles", A Paper Presented at the 5th Annual International Conference on Computer Games, Multimedia and Allied Technology, May 8, 2012, 9 Pages.

PCT Demand and Response to International Search Report and Written Opinion filed May 20, 2015 in PCT Application No. PCT/US2014/059987.

Ionescu, et al., "A Multimodal Interaction Method that Combines Gestures and Physical Game Controllers", In Proceedings of 20th International Conference on Computer Communications and Networks, Jul. 31, 2011, 6 pages.

"Softkinetic-Optrima", GamesIndustry International, Published on: Nov. 16, 2009, 3 pages, Available at: http://www.gamesindustry.biz/articles/softkinetic-optrima-3d-gesture-recognition-system-system-complete-with-camera.

Cox, Kate, "Microsoft's New Gadget Lets You Control Any Device With a Mid-Air Gesture", Published on: Oct. 9, 2012, 5 pages, Available at: http://kotaku.com/5950393/microsofts-new-gadget-lets-you-control-any-device-with-a-mid+air-gesture.

"Gesture-Based Computing", Education-2025, Published on: Jul. 15, 2012, 5 pages, Available at: http://education-2025.wikispaces.com/Gesture-Based+Computing.

Rick, Christophor, "Softkinetic and Optrima Unveil Universal 3D Gesture Recognition Solution", Published on: Nov. 16, 2009, 3 pages Available at: http://www.gamersdailynews.com/story-14573-Softkinetic-and-Optrima-Unveil-Universal-3D-Gesture-Recognition-Solution.html.

"Softkinetic Unveils Silhouette, The World's First Full Body 3D Gesture-Based Game", IGN, Published on: Sep. 29, 2009, 3 pages, Available at: http://www.ign.com/articles/2009/09/29/softkinetic-unveils-silhouette-the-worlds-first-full-body-3d-gesture-based-game.

"International Preliminary Report on Patentability Issued in PCT Patent Application No. PCT/US2014/059987", dated Jan. 25, 2016, 7 Pages.

Voluntary Amendments, with English translation of claims as amended therein, filed on Oct. 21, 2016 in Chinese Patent Application No. 201480056636.6, 13 pages.

"Summons to Attend Oral Proceedings Pursuant to Rule 115(1) Issued in European Patent Application No. 14809150.7", dated Jun. 26, 2018, 10 Pages.

Pietschmann, Chris, "Windows API Guide", Retrieved From https://www.ssucet.org/~jgallaher/download/etec481/VbApiGuide.pdf, Jul. 7, 2002, 68 Pages.

"Office Action Issued in European Patent Application No. 14809150.7", dated Dec. 20, 2017, 8 Pages.

"Office Action Issued in Chinese Patent Application No. 201480056636.6", dated Feb. 2, 2018, 10 Pages.

"Second Office Action Issued in Chinese Application No. 201480056636.6", dated Sep. 18, 2018, 11 Pages.

\* cited by examiner

BOOLEAN/FLOAT CONTROLLER AND GESTURE RECOGNITION SYSTEM

BACKGROUND

Gaming systems have evolved from those which provided an isolated gaming experience to networked systems providing a rich, interactive experience which may be shared in real time between friends and other gamers. Recent developments in the integration of a natural user interface (NUI) into a gaming system have opened a host of new possibilities for users to interface and control a gaming and other applications.

There is currently a split between gaming systems which use the more traditional hand-held controllers, and those that use a NUI system. It would be beneficial to develop a system which provides the advantages of both systems.

Moreover, traditional NUI systems generally use full or partial skeletal tracking and recognition as input for use by a software application. Such inputs may be more than is needed for a software developer when designing a software application.

SUMMARY

The present technology, roughly described, relates in general to a system for interacting with a software application such as a gaming application. The inputs may be received from one or both of a hand-held controller and a NUI system accepting gestural inputs. Embodiments of the present technology further include a gesture and controller application programming interface (API). The gesture and controller API may receive input from the controller as Boolean or floating point data. The gesture and controller API may also receive skeletal pose data from the NUI system and process that that data to Boolean or floating point data. In this way, data from both the controller and the NUI system may be exposed to the software application as easily consumable data in the same format.

In one example, the present technology relates to a content presentation and interaction system, comprising: controller providing tactile control input and communicatively coupled to the content presentation and interaction system, the controller including a plurality of tactile input mechanisms and providing a first set of control inputs to the content presentation and interaction system; a target recognition and tracking system communicatively coupled to the content presentation and interaction system, the target recognition and tracking system detecting pose information including skeletal data having absolute and relative positions of body joints; and a gesture and controller application programming interface for receiving pose information from the target recognition and tracking system and processing the pose information to identify gestural input in a format compatible with a format of the tactile control input.

In another example, the present technology relates to a method of providing input to a content presentation and interaction system, the method comprising: a. receiving tactile controller input from a hand-held controller, the input including Boolean and float values; b. receiving gestural input from a target recognition and tracking system, the gestural input including skeletal data having absolute and relative positions of body joints; c. receiving a Boolean or float value based on identification of a predefined gesture from the skeletal data; and d. providing the Boolean and/or float values from said steps a and/or c as inputs to a software application running on the content presentation and interaction system.

In a further example, the present technology relates to a computer readable medium for programming a processor to perform a method of providing input to a gaming console, the method comprising: a. receiving tactile controller input from a hand-held controller, the input including Boolean and float values; b. receiving gestural input from a target recognition and tracking system, the gestural input including skeletal data having absolute and relative positions of body joints; c. receiving speech input via a microphone of the target recognition and tracking system; d. analyzing via a processor of the content presentation and interaction system the speech input and skeletal data to discern predefined gestures defined by the speech input, or positions and/or movements of body parts; e. assigning a Boolean or float value to a predefined gesture discerned in said step d; and f. providing the Boolean and/or float values from said steps a and/or e as inputs to a gaming application running on the gaming console.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
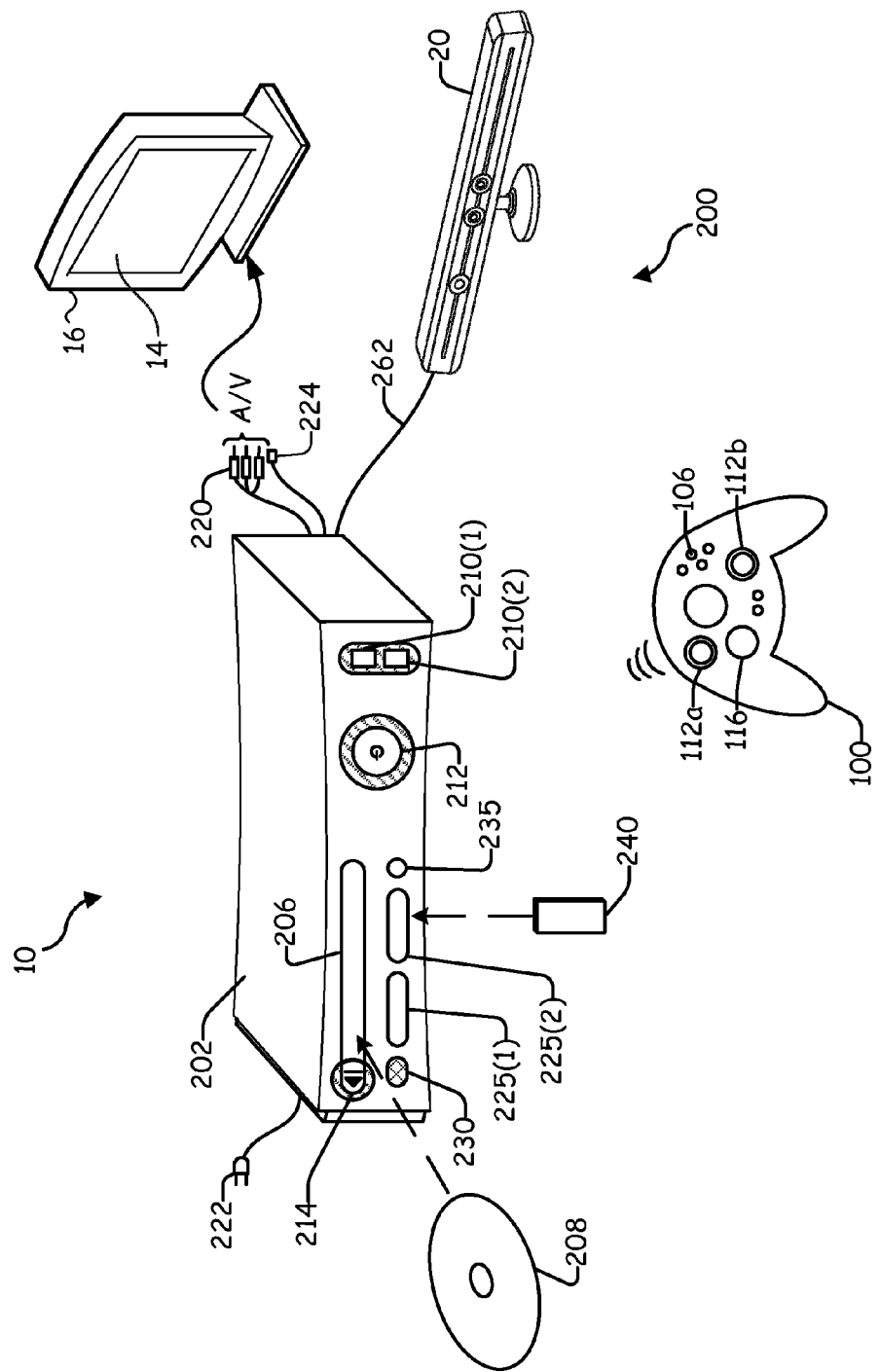
FIG. 1 depicts an exemplary gaming and media system in accordance with an embodiment of the present technology.

The present technology will now be described with reference to FIGS. 1-8, which in general relate to a system and method including input from one or both of a controller and NUI system for interacting with a software application such as a gaming application. Embodiments of the present technology further include a gesture and controller API. The inputs from the controller may be Boolean, i.e., one of two states. Examples include pressing a button, pulling a trigger or toggling a switch on the controller. Inputs from the controller may alternatively be floating point, i.e., analog values normalized for example to between −1 and 1. Examples include measuring the degree and position along respective x and y axes of a joy stick. The gesture and controller API may accept inputs from the controller and pass them through for use as control inputs by a software application.

Gestural inputs from the NUI system are received in the gesture and controller API as skeletal data, including for example the positions body parts, relative to each other, in three dimensional space. The gesture and controller API receives these inputs and converts them to Boolean or floating point data, so that they can be exposed to the software application as easily consumable control inputs in the same format as the control inputs received from the controller.

FIGS. 1-4 show an exemplary content presentation and interaction system, referred to herein as gaming and media system 10. As shown in FIGS. 1-4, gaming and media system 10 includes a computing console (hereinafter "console") 202. The console 202 may include hardware components and/or software components such that console 202 may be used to execute applications such as gaming and non-gaming applications. In one embodiment, console 202 may include a processor such as a standardized processor, a specialized processor, a microprocessor, or the like that may execute instructions stored on a processor readable storage device for performing processes described herein.

Console 202 is equipped with an internal hard disk drive (not shown) and a portable media drive 206 that support various forms of portable storage media, as represented by optical storage disc 208. Examples of suitable portable storage media include DVD, CD-ROM, game discs, and so forth. Console 202 also includes two memory unit card receptacles 225(1) and 225(2), for receiving removable flash-type memory units 240. A command button 235 on console 202 may enable and disable wireless peripheral support.

Console 202 also includes an optical port 230 for communicating wirelessly with one or more devices and two USB (Universal Serial Bus) ports 210(1) and 210(2) to support a wired connection for additional controllers, or other peripherals. In some implementations, the number and arrangement of additional ports may be modified. A power button 212 and an eject button 214 are also positioned on the front face of game console 202. Power button 212 is selected to apply power to the game console, and can also provide access to other features and controls, and eject button 214 alternately opens and closes the tray of a portable media drive 206 to enable insertion and extraction of a storage disc 208.

The console 202 may be connected to an audio/visual device 16 having a display 14. The device 16 may for example be a television, a monitor, a high-definition television (HDTV), or the like that may provide game or application visuals and/or audio to a user. For example, the console 202 may include a video adapter such as a graphics card and/or an audio adapter such as a sound card that may provide audio/visual signals associated with the game or other application. The audio/visual device 16 may receive the audio/visual signals from the console 202 and may then output the game or application visuals and/or audio associated with the audio/visual signals. According to one embodiment, the audio/visual device 16 may be connected to the console 202 via A/V cables 220, which may for example be an S-Video cable, a coaxial cable, an HDMI cable, a DVI cable, a VGA cable, a component video cable, or the like.

A power cable 222 provides power to the game console. Console 202 may be further configured with broadband capabilities, as represented by a cable or modem connector 224 to facilitate access to a network, such as the Internet. The broadband capabilities can also be provided wirelessly, through a broadband network such as a wireless fidelity (Wi-Fi) network.

The console 202 is capable of receiving user input from at least two sources: controller 100 and a NUI system, also referred to as a target recognition and tracking system 200, explained below. Each controller 100 is coupled to console 202 via a wired or wireless interface. In the illustrated implementation, the controller 100 is coupled to console 202 via a wireless connection. In an example illustrated in FIGS. 1 and 2, controller 100 is equipped with a variety of hand or finger/thumb actuated controls, including for example two thumbsticks (or joysticks) 112(a) and 112(b), a directional pad 114, buttons 106, and two triggers 110, explained in greater detail below. Input from any of these or other actuators on controller 100 is referred to herein as tactile control input.

Figure 2:
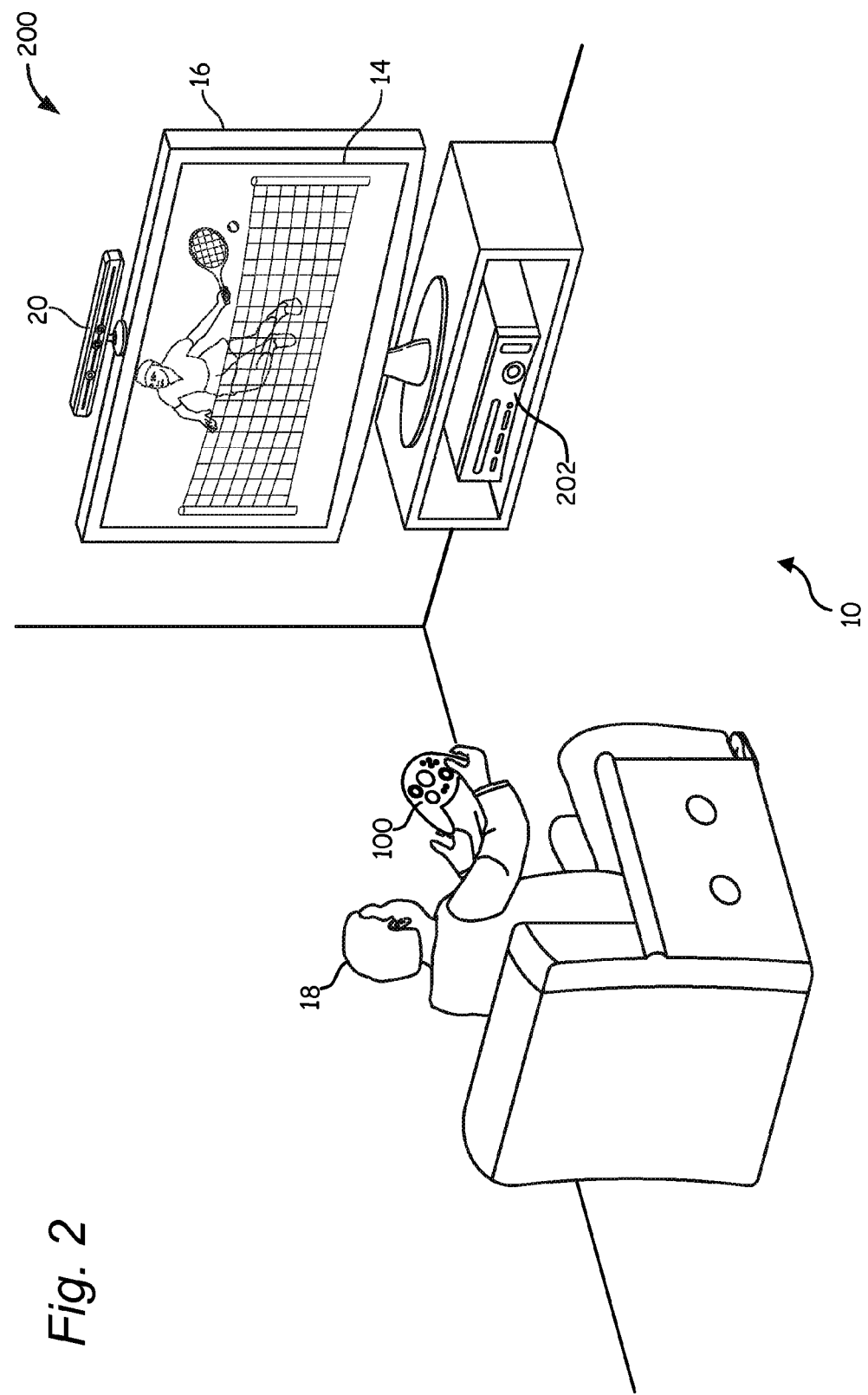
FIG. 2 depicts an exemplary use of a gaming and media system in accordance with an embodiment of the present technology
Figure 3:
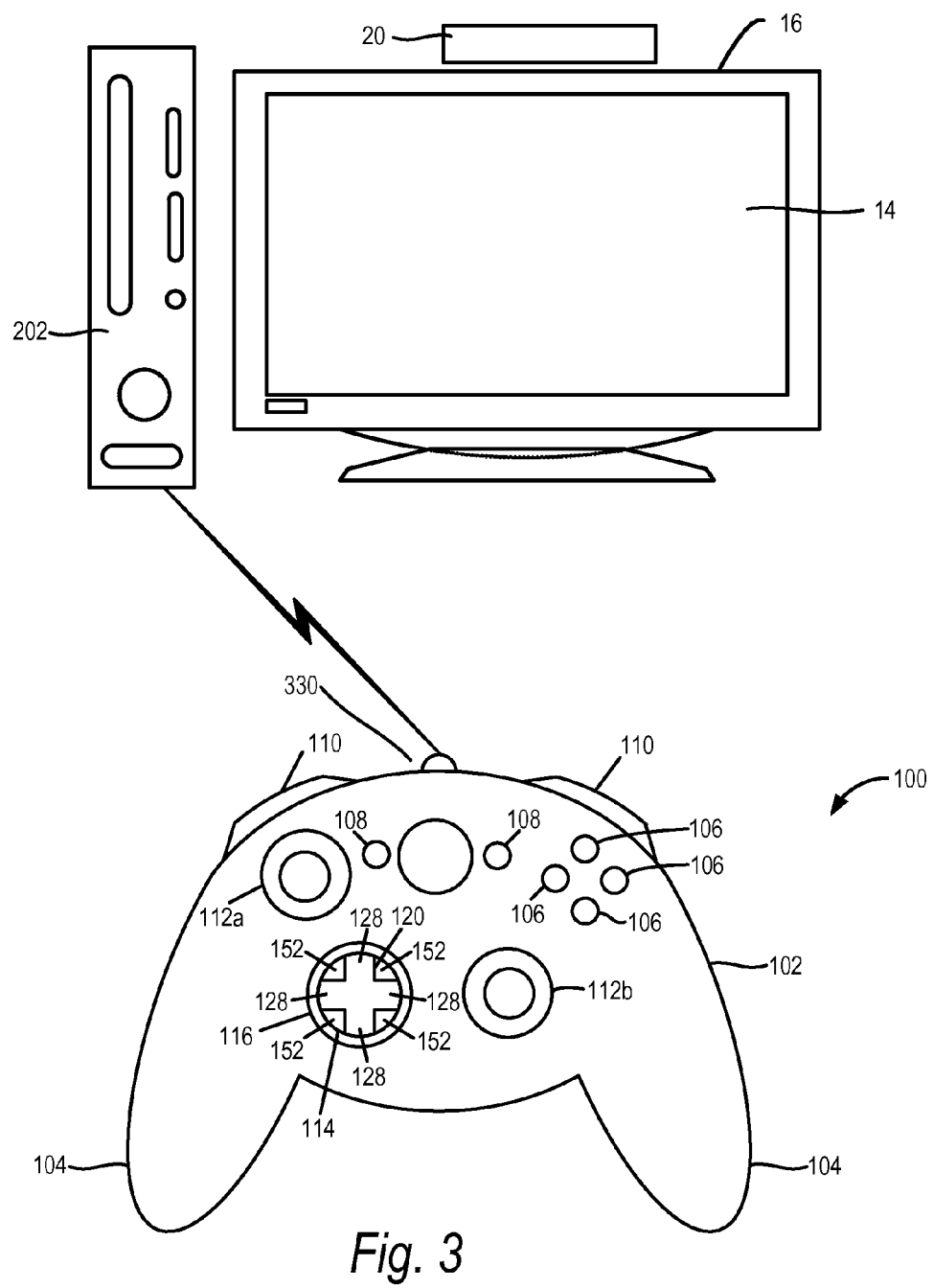
FIG. 3 illustrates further detail of a controller of the gaming and media system in accordance with an embodiment of the present technology.

FIG. 2 illustrates further detail of an exemplary embodiment of a tactile controller 100. As illustrated in FIG. 2, a user may view content on display 14 using console 202. Controller 100 may for example comprise a controller for an "Xbox" device. However, it is understood that controller 100 may be used for other interactive platforms. Additionally, a description of one example of controller 100 follows, but it is not intended to be limiting on the type of controller which may be used with the present technology.

Controller 100 includes a housing or body 102 forming a majority of the exterior surface of the controller having a shape to interface with the hands of a user. A pair of hand grips 104 extend from a lower portion of the body. A set of input or action buttons 106 are positioned at an upper right portion of the body. These input buttons may be referred to as face buttons due to their orientation on the top face of the body 102 of the controller. The input buttons may be simple switches generating a signal having a binary output to indicate selection by a user. In other examples, the input buttons may be pressure-sensitive switches that generate signals indicating different levels of selection by the user. Additional input buttons 108 are provided at an upper central position of the body and may provide additional functions, such as for navigating a graphical user interface menu. Input buttons 108 may also provide binary or multi-level response signals. A set of input buttons 110 are provided at an upper face of the controller body 102, often referred to as triggers for their intended actuation by the fingers. In many examples, these types of triggers are pressure-sensitive, but need not be.

The first analog thumb stick 112a is provided at an upper left portion of the face of body 102 and a second analog thumb stick 112b is provided at a lower right hand portion of the face of body 102. Each analog thumb stick allows so-called analog input by determining a precise angle of the thumb stick relative to a fixed base portion. Moreover, the analog thumb sticks measure the amount of movement of the stick at the precise angle in order to generate signals responsive to different amounts of input in any direction.

The directional pad (D-pad) 114 is formed in a recess 116 at a center left portion of the face of body 102. In other examples, the D-pad may be formed above the controller surface without a recess. The D-pad includes an actuation surface comprising a cross-shaped input pad 120 and four fill tabs 152. In this example, the input pad includes four input arms 128. In other examples, the input pad may include more or less than four input arms. In one example, the D-pad allows a user to provide directional input control for four distinct ordinate directions (e.g., NSEW) corresponding to the four input arms 128.

The actuation surface topology of D-pad 114 is configurable by a user. In one example, the fill tabs 152 are moveable with respect to input pad 120 to change a distance between the upper surface of input pad 120 and the upper surface of the fill tabs. In this manner, the actuation surface topology of the D-pad may be altered by a user. With the fill tabs 152 in an upward position with respect to the input tab 120, a circular or platter-shaped actuation configuration is provided, and with the fill the tabs in a lowered position with respect to the upper surface of the input tab, a cross-shaped actuation configuration is provided.

In one embodiment, input pad 120 and fill tabs 152 are rotatable within recess 116 about a central axis of the directional pad extending perpendicular to a central portion of the actuation surface. Rotation of input pad 120 and fill tabs 152 causes linear translation of the fill tabs parallel to the central axis. By rotating directional pad 114 in a clockwise or counter clockwise direction about the central axis, the surface topology of actuation surface 118 can be changed. The linear translation of the fill tabs changes the distance between the upper surface of input arms 128 and the upper surface of fill tabs 152, thus altering the actuation surface topology of the directional pad.

The controller 100 described above is merely representative, and the controller 100 may have a variety of different hand-actuated controls in further embodiments. Additionally, while a single controller 100 is shown, in further embodiments, there may be more than one controller 100, having the same or differing configurations. In further embodiments, the controller 100 may include various sensor technologies including inertial sensing using inertial measurements from accelerometers and gyroscopes, global positioning system (GPS), or the like to determine movement, position and orientation of the controller 100 as it is manipulated by a user.

In one implementation, a memory unit (MU) 240 (FIG. 1) may also be inserted into controller 100 to provide additional and portable storage. Portable MUs enable users to store game parameters for use when playing on other consoles. In this implementation, each controller is configured to accommodate two MUs 240, although more or less than two MUs may also be employed.

In addition to controller 100, input to an application running on console 202 may further be provided by the target recognition, analysis, and tracking system 200. As noted above, the system 200 may be a NUI system used to recognize, analyze, and/or track movements and gestures of a human target such as the user 18 in FIG. 3. Embodiments of the target recognition, analysis, and tracking system 200 include the console 202 described above for executing gaming or other applications.

The system 200 further includes a capture device 20 for capturing image and audio data relating to one or more users and/or objects sensed by the capture device. In embodiments, the capture device 20 may be used to capture information relating to movements, gestures and speech of one or more users 18, which information is received by the console 202 and used to render, interact with and/or control aspects of a gaming or other application. Examples of the console 202 and capture device 20 are explained in greater detail below.

The application running on console 202 may be a variety of gaming and non-gaming applications. Moreover, the system 200 may further be used to interpret user 18 movements as operating system and/or application controls that are outside the realm of games or the specific application running on console 202. As one example, a user may scroll through and control interaction with a variety of menu options presented on the display 14. Virtually any controllable aspect of an operating system and/or application may be controlled by movements of the user 18.

The target recognition and tracking system 200 may comprise a system such as the Microsoft Kinect® controller, various embodiments of which are described in the following co-pending patent applications: U.S. patent application Ser. No. 12/475,094, entitled "Environment and/or Target Segmentation," filed May 29, 2009; U.S. patent application Ser. No. 12/511,850, entitled "Auto Generating a Visual Representation," filed Jul. 29, 2009; U.S. patent application Ser. No. 12/474,655, entitled "Gesture Tool," filed May 29, 2009; U.S. patent application Ser. No. 12/603,437, entitled "Pose Tracking Pipeline," filed Oct. 21, 2009; U.S. patent application Ser. No. 12/475,308, entitled "Device for Identifying and Tracking Multiple Humans Over Time," filed May 29, 2009, U.S. patent application Ser. No. 12/575,388, entitled "Human Tracking System," filed Oct. 7, 2009; U.S. patent application Ser. No. 12/422,661, entitled "Gesture Recognizer System Architecture," filed Apr. 13, 2009; and U.S. patent application Ser. No. 12/391,150, entitled "Standard Gestures," filed Feb. 23, 2009.

Figure 4:
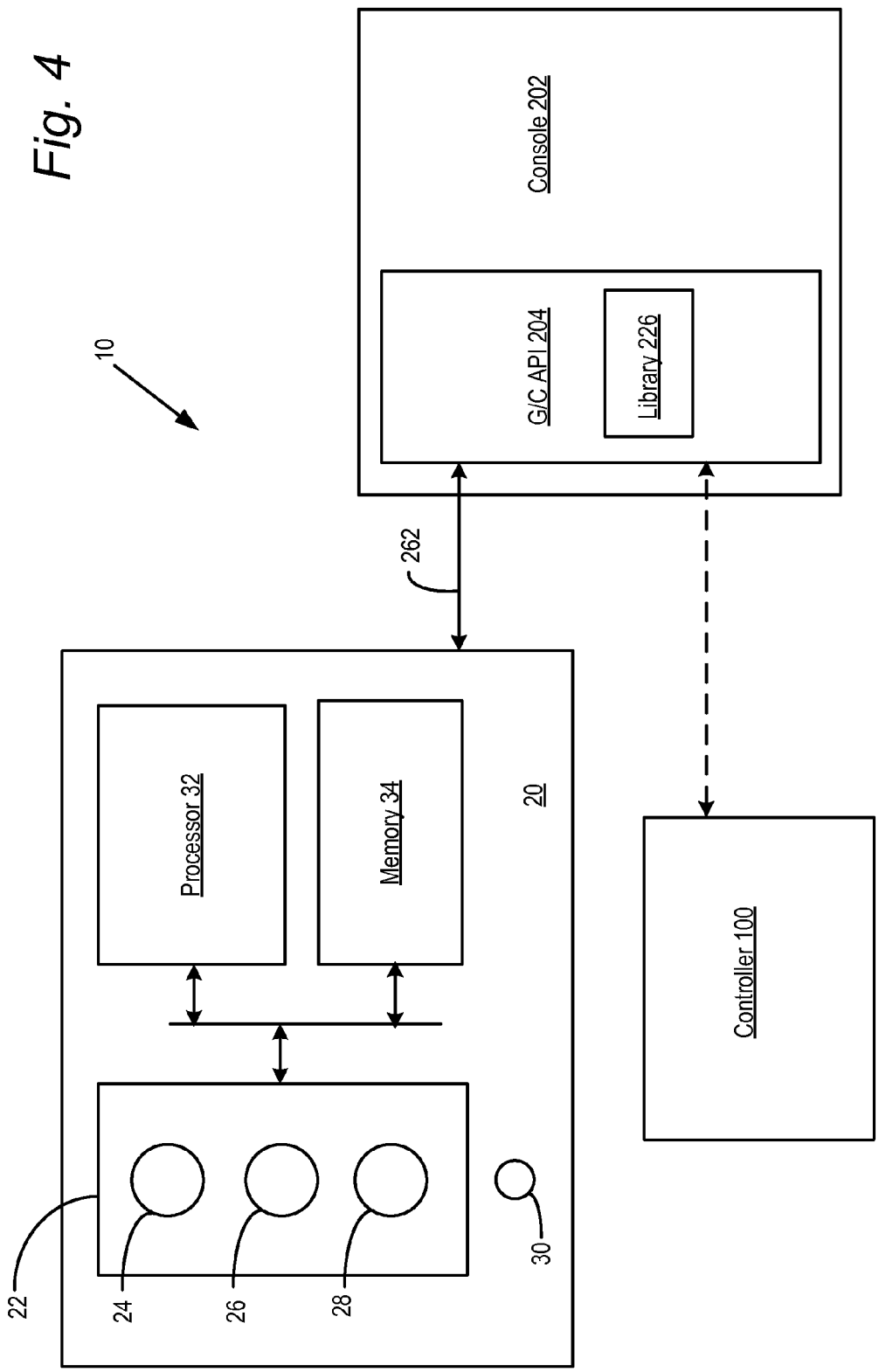
FIG. 4 depicts a block diagram of an overview of components for implementing embodiments of the present technology.
Figure 5:
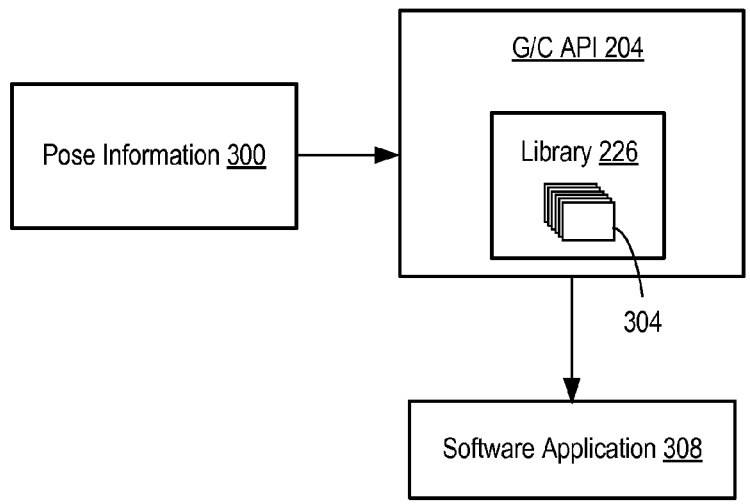
FIG. 5 is a block diagram of an exemplary system including an application programming interface for implementing embodiments of the present technology.
Figure 6:
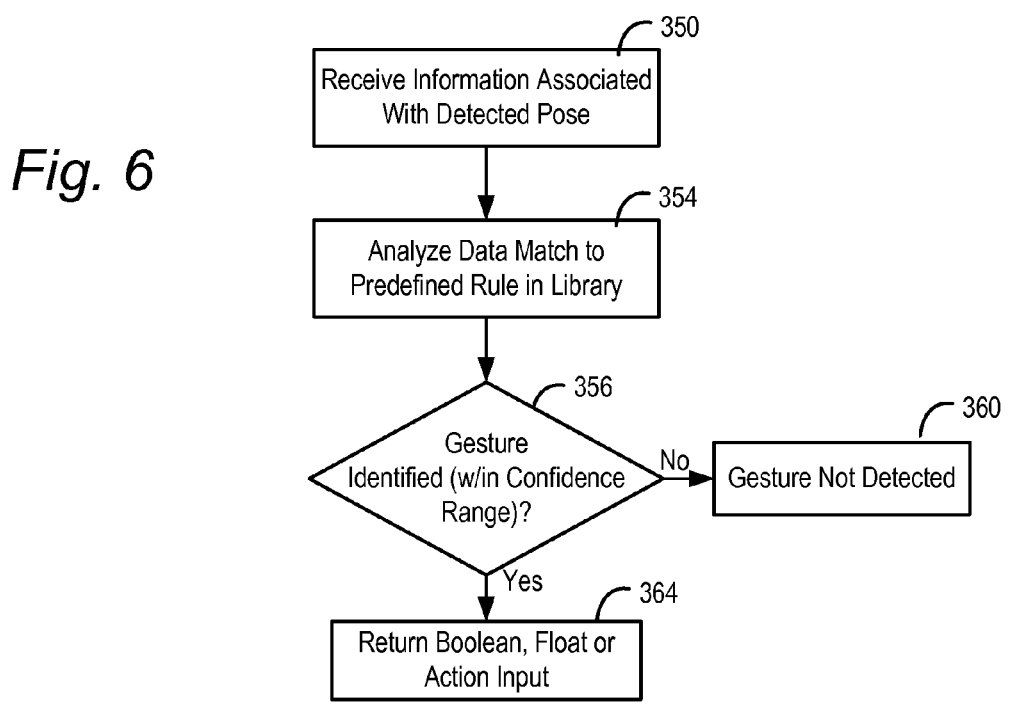
FIG. 6 is a flowchart illustrating an exemplary operation of an embodiment of the present technology.

FIG. 4 illustrates further details of an example embodiment of the capture device 20 and controller 100 that may be used in the gaming and media system 10. In one example, the capture device 20 may be configured to capture video having a depth image that may include depth values via any suitable technique including, for example, time-of-flight, structured light, stereo image, or the like. According to one embodiment, the capture device 20 may organize the calculated depth information into "Z layers," or layers that may be perpendicular to a Z axis extending from the depth camera along its line of sight.

As shown in FIG. 4, the capture device 20 may include an image camera component 22. According to an example embodiment, the image camera component 22 may be a depth camera that may capture the depth image of a scene. The depth image may include a two-dimensional (2-D) pixel area of the captured scene where each pixel in the 2-D pixel area may represent a depth value such as a length or distance in, for example, centimeters, millimeters, or the like of an object in the captured scene from the camera.

As shown in FIG. 4, according to an example embodiment, the image camera component 22 may include an IR light component 24, a three-dimensional (3-D) camera 26, and an RGB camera 28 that may be used to capture the depth image of a scene. For example, in time-of-flight analysis, the IR light component 24 of the capture device 20 may emit an infrared light onto the scene and may then use sensors (not shown) to detect the backscattered light from the surface of one or more targets and objects in the scene using, for example, the 3-D camera 26 and/or the RGB camera 28.

In some embodiments, pulsed infrared light may be used such that the time between an outgoing light pulse and a corresponding incoming light pulse may be measured and used to determine a physical distance from the capture device 20 to a particular location on the targets or objects in the scene. Additionally, in other example embodiments, the phase of the outgoing light wave may be compared to the phase of the incoming light wave to determine a phase shift. The phase shift may then be used to determine a physical distance from the capture device 20 to a particular location on the targets or objects.

According to another example embodiment, time-of-flight analysis may be used to indirectly determine a physical distance from the capture device 20 to a particular location on the targets or objects by analyzing the intensity of the reflected beam of light over time via various techniques including, for example, shuttered light pulse imaging.

The capture device 20 may further include a microphone 30. The microphone 30 may include a transducer or sensor that may receive and convert sound into an electrical signal. According to one embodiment, the microphone 30 may be used to reduce feedback between the capture device 20 and the console 202 in the target recognition, analysis, and tracking system 10. Additionally, the microphone 30 may be used to receive audio signals that may also be provided by the user to control applications such as game applications, non-game applications, or the like that may be executed by the console 202.

In an example embodiment, the capture device 20 may further include a processor 32 that may be in operative communication with the image camera component 22. The processor 32 may include a standardized processor, a specialized processor, a microprocessor, or the like that may execute instructions that may include instructions for receiving the depth image, determining whether a suitable target may be included in the depth image, converting the suitable target into a skeletal representation or model of the target, or any other suitable instruction.

The capture device 20 may further include a memory component 34 that may store the instructions that may be executed by the processor 32, images or frames of images captured by the 3-D camera or RGB camera, or any other suitable information, images, or the like. According to an example embodiment, the memory component 34 may include random access memory (RAM), read only memory (ROM), cache, Flash memory, a hard disk, or any other suitable storage component. As shown in FIG. 2, in one embodiment, the memory component 34 may be a separate component in communication with the image camera component 22 and the processor 32. According to another embodiment, the memory component 34 may be integrated into the processor 32 and/or the image camera component 22.

As shown in FIGS. 1 and 4, the capture device 20 may be in communication with the console 202 via a communication link 262. The communication link 262 may be a wired connection including, for example, a USB connection, a Firewire connection, an Ethernet cable connection, or the like and/or a wireless connection such as a wireless 802.11b, g, a, or n connection. According to one embodiment, the console 202 may provide a clock to the capture device 20 that may be used to determine when to capture, for example, a scene via the communication link 262.

Additionally, the capture device 20 may provide the depth information and images captured by, for example, the 3-D camera 26 and/or the RGB camera 28, and a skeletal model that may be generated by the capture device 20 to the console 202 via the communication link 262. A variety of known techniques exist for determining whether a target or object detected by capture device 20 corresponds to a human target. Skeletal mapping techniques may then be used to determine various spots on that user's skeleton, joints of the hands, wrists, elbows, knees, nose, ankles, shoulders, and where the pelvis meets the spine. Other techniques include transforming the image into a body model representation of the person and transforming the image into a mesh model representation of the person.

The skeletal model may then be provided to the console 202 such that the console may perform a variety of actions. In particular, the skeletal model may be provided to a gesture and controller API 204. As explained below, the gesture and controller API 204 may take the skeletal input from the capture device 20 and extract Boolean and/or float values for use as inputs to a gaming or other application running on the console 202.

Gaming and media system 10 is generally configured for playing games stored on a memory medium, as well as for downloading and playing games, and reproducing pre-recorded music and videos, from both electronic and hard media sources. With the different storage offerings, titles can be played from the hard disk drive, from an optical disk media (e.g., 208), from an online source, or from MU 240. A sample of the types of media that gaming and media system 10 is capable of playing include:

Game titles played from CD and DVD discs, from the hard disk drive, or from an online source;

Digital music played from a CD in portable media drive 206, from a file on the hard disk drive (e.g., music in the Windows Media Audio (WMA) format), or from online streaming sources;

Digital audio/video played from a DVD disc in portable media drive 206, from a file on the hard disk drive (e.g., Active Streaming Format), or from online streaming sources.

In operation, console 202 is configured to receive input from controller 100 and the capture device 20 via the gesture and controller API 204. In accordance with aspects of the present technology, the gesture and controller API 204 processes input from the capture device 20 and, possibly, from the controller 100 so that these inputs appear substantially the same, namely, as Boolean values for two-state inputs and float values for analog inputs.

Conventionally, the capture device 20 provides input in the form of a skeletal model. However, some game and other software application developers may not want to work with a skeletal model as input. Typically, software applications which use skeletal models first pull in three-dimensional skeletal data, then analyze the data to determine the positions of multiple body joints and where body joints are relative to each other. This information may then be used as input, for example to create an avatar of the user on the display 14 which moves as the user moves.

While the use of skeletal models provides a powerful tool for creating robust interactive experiences, some software developers would prefer to write games and other applications which take in data simply as Boolean or float values to simplify the game or other application development. This is made possible in accordance with the present technology by the gesture and controller API 204, which processes data from the capture device 20 and, possibly, the controller 100, including converting the data into Boolean and float inputs.

The gesture and controller API 204 (also referred to as API 204) includes a library 226 with definitions of how various skeletal models are to be interpreted and converted into Boolean or float inputs for use by an application running on the console 202. One embodiment of the API 204 for receiving skeletal model data and processing the data into Boolean or float inputs will now be explained with reference to FIGS. 5 and 6.

A scene including user position and movement may be detected by the capture device 20 once a frame. From this data, pose information 300 is passed to the API 204 in step 350. The pose information includes a three-dimensional skeletal model of a user and other parameters. Such additional parameters may include the x, y and z minimum and maximum image plane positions detected by the capture device 20. The parameters may also include a measurement on a per-joint basis of the velocity and acceleration for discrete time intervals. Thus, in embodiments, the API 204 receives a large amount of data, including a full picture of the position and kinetic activity of all points in the user's body.

In accordance with aspects of the present technology, the API 204 may interpret simple body positions and movements as gestures as set forth in predefined rules. In particular, the API 204 may analyze the received pose information 300 in step 354 to see if the pose information (or a portion of the pose information) matches any predefined rule 304 stored within a library 226. In embodiments, a stored rule comprises information defining a gesture, action or condition along with parameters, or metadata, for that gesture, action or condition. A stored rule 304 describes particular positions and/or kinetic motions which, when detected in the pose information 300, are to be interpreted as a predefined gesture. In embodiments, each gesture may have a different rule or set of rules 304. That is, each gesture may be defined by a single rule.

As noted above, the pose information provides a large amount of data which may be used and interpreted. However, in one embodiment, the rules 304 in library 226 define gestures that are Boolean, for example TRUE (1) or FALSE (0). In this manner, the complex pose information may be simplified by the API 204 to provide simple Boolean gestural input to a software application running on console 202. For example, a rule 304 may look for whether a user's hand is touching (e.g., TRUE) or is not touching (e.g., FALSE) the user's head. This rule can ignore most of the position information 300, and simply discern whether or not the data shows a user's hand on his or her head. If a user's hand is on the head, the API 204 may provide an input of 1 to the software application 308 running on console 202. If the user's hand is not on the head, the API 204 may provide an input of 0 to the software application 308 running on console 202. These 1, 0 values may be reversed in further embodiments.

Different rules 304 may define a wide variety of other gestures resulting in a Boolean input from the API 204. For example, rules 304 may be defined for any of two joints or body parts touching each other (touching=1, not touching=0); hand up (1) or hand down (0); speaking (1) or not speaking (0); speaking a particular phrase/command (1) or not speaking that phrase/command (0); leg lifted (1) or leg on the ground (0). Each of these 1, 0 values may be reversed in further embodiments. A wide variety of other rules may be defined to discern a TRUE/FALSE gesture from the pose information 300.

In embodiments described above, simple-to-discern body positions are used as predefined gestures by the API 204 to provide Boolean inputs to the software application 308 running on console 202. However it is understood that more complex body positions may be used as predefined gestures by the API 204 to provide Boolean inputs to the software application 308. For example, it is conceivable that a gesture may involve a variety of joints to be positioned in a defined manner relative to each other, and when those relative positions are detected from the pose data, the gesture is detected and the API 204 may provide an input of 1. If not, the input is 0.

In addition to providing simple Boolean inputs to the application 308, the API 204 may also or alternatively discern floating value inputs, or simply float inputs, from the pose information 300. Float inputs may be discerned in a manner similar to Boolean inputs, except that values may range from 0 to 1, or from −1 to 1 in further embodiments. As above, the API 204 may be defined to look for specific positions or movements defined by rules 304. In the case of float inputs, a general position may qualify as a predefined gesture, and in addition take as input variations in the general position which are normalized to a value from 0 to 1 (or −1 to 1), depending on how extreme the variation is.

As one example of a float input, a rule 304 may be defined to detect whether a user is leaning Could be forward, left, right etc. When a user is leaning, that position may be detected by the rule 304 defined for leaning. The rule 304 may also take as an input the degree of lean, between an upright, "neutral" position and leaning to a maximum extent (which can be an arbitrary, predetermined degree of leaning). Thus, a slight lean may receive a float value close to 0, and a significant lean may receive a float value of close to 1. In this instance, the API 204 may provide that a leaning gesture was detected, together with a float value for the lean. A lean to the left may be provided with a float value of between 0 and 1, and a lean to the right may be provided with a float value of between 0 and 1. Alternatively, a left/right lean may be provided with a float value of between −1 (extreme left lean) and 1 (extreme right lean).

There may be additional normalization processes. For example, the API 204 may normalize for different size users (as measured by the capture device 20). Thus, even though an extreme lean by a large user may be more exaggerated in absolute terms than an extreme lean by a smaller user, both may be normalized to the same values. Normalization may also take place between different software applications 308. Thus a float value assigned for a given position will be the same across multiple software applications.

A lean is one example of simply measured body positions which may define a float input provided by the API 204, and it is understood that a wide variety of other simply measured body positions may be discerned from the pose information 300 as float inputs. Some additional float inputs include but are not limited to:

body tilt, body twist,
bending from the waste,
leg or arm raises,
speech (where for example volume may be normalized between predetermined minimum and maximum as a float value), and
head rotation about one or more of perpendicular x, y and z axes.

Others are contemplated.

Moreover, it is understood that more complex body position ranges may be used as predefined gestures by the API 204 to provide float inputs to the software application 308. For example, it is conceivable that a gesture may involve a variety of joints to be positioned in a defined manner relative to each other, and that variations from a neutral position may define the range of float values.

In addition to Boolean and float inputs, the API 204 may further provide input regarding so-called action gestures. These are gestures that take place over time. In particular, using rules 304, the API 204 may function to recognize gestures which take place over a plurality of frames of data from capture device 20. Toward this end, the API 204 may include an input-over-time archive that tracks recognized gestures and other input, a Hidden Markov Model implementation (where the modeled system is assumed to be a Markov process—one where a present state encapsulates any past state information used to determine a future state, so no other past state information has to be maintained for this purpose—with unknown parameters, and hidden parameters are determined from the observable data), as well as other functionality to solve particular instances of gesture recognition.

Each action gesture may be defined by a rule 304 including a property (such as a kick or slash) that is either null (i.e., no action is currently being detected) or populated with an object that will give a 3D vector and a limb type. The 3D vector may indicate either a direction of the action or a significant position for the action. The limb type may signify which limb is performing that action (left hand, right hand, left foot, right foot, etc.

Example of action gestures include, but are not limited to:

Point—an arm is fully extended in a direction. Vector is the direction the arm is pointing. Ignores hands when they are at a user's side.

Slash—an arm is quickly moved across the body. Vector is the direction of the arm movement.

Stab—an arm is quickly moved outward from the body. Vector is the direction of the arm extension.

Push—an arm is moved outward from the body in a slower fashion that the stab. Vector is in the direction of the push.

Pull—an arm is moved inward towards the body in an average pace. Vector is in the direction of the pull.

Hold—an arm (may alternatively be leg) is held still for a given amount of time. Vector is the position of the held limb.

Kick—a leg is quickly moved away from the body in a flat or upward fashion. Vector is the direction of the kick.

Stomp—a leg is quickly moved towards the ground. Vector is the direction of the stomp.

Others are contemplated.

Referring again to FIG. 6, a Boolean, float or action gesture may be detected in step 356. In embodiments, the gesture may be detected simply as a pass/fail. Alternatively, the API 204 may determine both an identified gesture and a confidence level which corresponds to the likelihood that the user's position/movement corresponds to that gesture. In particular, in addition to defining the parameters for a gesture, a rule may further include a threshold confidence level to be achieved before pose information 300 is to be interpreted as a gesture. Some gestures may have more impact as system commands or gaming instructions, and as such, have a higher confidence level before a pose is interpreted as that gesture. The comparison of the pose information against the stored parameters for a rule results in a cumulative confidence level as to whether the pose information indicates a gesture. In embodiments, the confidence level can be set or modified by the game developer.

Once a confidence level has been determined as to whether a given pose or motion satisfies a given gesture rule, the API 204 then determines in step 556 whether the confidence level is above a predetermined threshold for the rule under consideration. The threshold confidence level may be stored in association with the rule under consideration. If the confidence level is below the threshold, no gesture is detected (step 360) and no action is taken. On the other hand, if the confidence level is above the threshold, the user's motion is determined to satisfy the gesture rule under consideration, and then the type of gesture (Boolean, float or action) is returned, together with any input values associated with that gesture. As noted, gestures may be determined without confidence levels in further embodiments on either a pass (step 364) or fail (step 360) basis.

Once a gesture has been detected, the type of gesture and input values may then be used by the software application 308 to control or affect game metrics. Alternatively, the type of gesture and input values may be used by the operating system for console 202 instead of the software application to affect a control function within the operating system.

In embodiments described above, the input may be used by a poll-based software application 308. Periodically, for example 30 or 60 times a second, the software application 308 polls inputs (controllers, keyboards, skeletal tracking, etc.), decides what to do based on the received input, and then determines game state and renders graphics. However, in a further embodiments, the input may be used by an event-based software application 308, such as for example where the software application 308 does not need to update every 30 or 60 times a second. Event based software applications 308 may update only when an input event takes place.

In the event-based embodiment, the software application 308 waits for the controller 100 or target recognition, analysis, and tracking system 200 to send an "event" indicating there is an update. At that point the software application 308 may process the input, update game state, and then goes back to waiting for the next event to handle.

In order to know which of these events to handle (since there can be many, many events from operating system events to controller events to keyboard events, etc.), the software application 308, possibly on start-up, determines which events it is to be called for. It may do this by registering handlers for the desired events. A handler is software code that is run when a specific event is "thrown." For example, a button pressed event is thrown when a user presses a controller button on controller 100.

The API 204 may be written to handle poll-based or event-based processing. In order to handle event-based processing, the API defines events that are thrown, together with any data associated with that event, such as for example which button on a controller was pressed, etc. The API also defines a way in which handlers are registered for these events so that the code of the software application 308 using the API 204 can choose what code (if any) gets executed when the various events get thrown.

In accordance with aspects of the present technology, the system 10 may receive tactile control input from controller 100 and gestural input from the target recognition and tracking system 200. It is conceivable that the tactile control input and gestural input be received at the same time, for example where a user is performing a gesture while actuating the controller 100. The tactile control input and gestural input may be received at different times.

Additionally, in accordance with further aspects of the present technology, the API 204 may process the gestural inputs so as to be in the same format (for example, Boolean or float) as the tactile control input. Thus, game developers may develop games which take input from both the controller 100 and target recognition and tracking system 200 in the same format. This simplifies game development over a system which receives tactile control input as Boolean or float, and gestural input as skeletal data.

In embodiments, the API 204 may process both the tactile control input and the gestural input. For example, in addition to recognizing predefined gestures from the skeletal data, the API 204 may filter the data from the controller 100 and the skeletal data. For example, a high pass filter may be employed to ignore spurious data. It is understood that the API may perform other operations on the skeletal data and/or tactile control input data. In further embodiments, the API 204 may process on the skeletal data and not the tactile control data.

Figure 7:
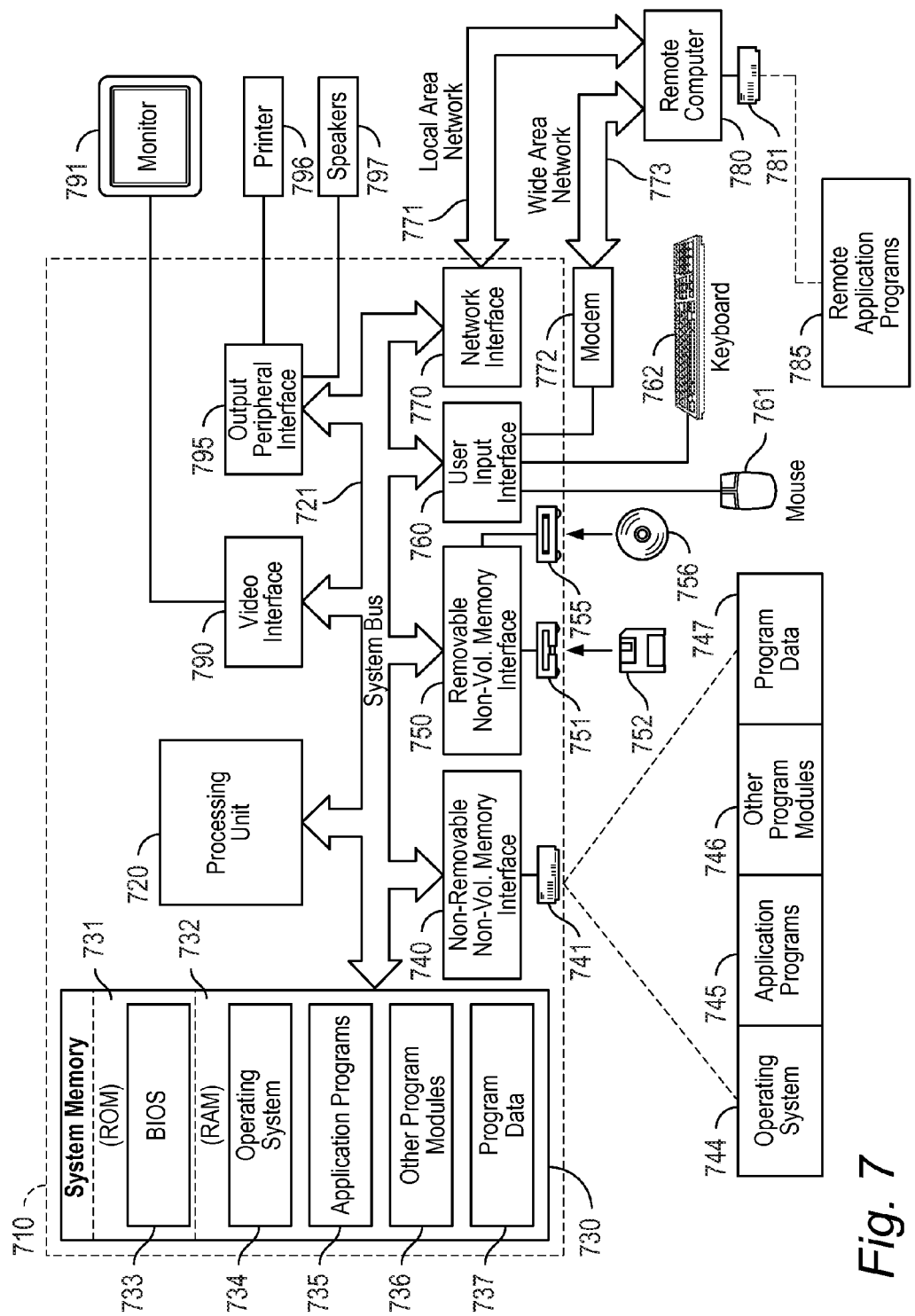
FIG. 7 is a block diagram of an exemplary processing device.

FIG. 7 illustrates an example of a suitable computing system environment which may be used in the foregoing technology as any of the processing devices described herein. Multiple computing systems may be used as servers to implement the place service.

With reference to FIG. 7, an exemplary system for implementing the invention includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. Computer readable media can be any available tangible media that can be accessed by computer 710, including computer storage media. Computer readable media does not include transitory, modulated or other transmitted data signals that are not contained in a tangible media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the information and which can accessed by computer 710.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies. A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790. In addition to the monitor, computers may also include other peripheral output devices such as speakers 797 and printer 796, which may be connected through an output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

FIG. 19 is a block diagram of an exemplary mobile device which may operate in embodiments of the technology as the touch interface device. Exemplary electronic circuitry of a typical mobile device is depicted. The mobile device 900 includes one or more microprocessors 912, and memory 1010 (e.g., non-volatile memory such as ROM and volatile memory such as RAM) which stores processor-readable code which is executed by one or more processors of the control processor 912 to implement the functionality described herein.

Mobile device 900 may include, for example, processors 912, memory 1010 including applications and non-volatile storage. Applications may include the secondary interface which is provided to the user interface 918. The processor 912 can implement communications, as well as any number of applications, including the interaction applications discussed herein. Memory 1010 can be any variety of memory storage media types, including non-volatile and volatile memory. A device operating system handles the different operations of the mobile device 900 and may contain user interfaces for operations, such as placing and receiving phone calls, text messaging, checking voicemail, and the like. The applications 1030 can be any assortment of programs, such as a camera application for photos and/or videos, an address book, a calendar application, a media player, an internet browser, games, other multimedia applications, an alarm application, other third party applications, the interaction application discussed herein, and the like. The non-volatile storage component 1040 in memory 1010 contains data such as web caches, music, photos, contact data, scheduling data, and other files.

The processor 912 also communicates with RF transmit/receive circuitry 906 which in turn is coupled to an antenna 902, with an infrared transmitted/receiver 908, with any additional communication channels 1060 like Wi-Fi or Bluetooth, and with a movement/orientation sensor 914 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 912 further communicates with a ringer/vibrator 916, a user interface keypad/screen 918, one or more speakers 1020, a microphone 922, a camera 924, a light sensor 926 and a temperature sensor 928. The user interface, keypad and screen may comprise a capacitive touch screen in accordance with well know principles and technologies.

The processor 912 controls transmission and reception of wireless signals. During a transmission mode, the processor 912 provides a voice signal from microphone 922, or other data signal, to the RF transmit/receive circuitry 906. The transmit/receive circuitry 906 transmits the signal to a remote station (e.g., a fixed station, operator, other cellular phones, etc.) for communication through the antenna 902. The ringer/vibrator 916 is used to signal an incoming call, text message, calendar reminder, alarm clock reminder, or other notification to the user. During a receiving mode, the transmit/receive circuitry 906 receives a voice or other data signal from a remote station through the antenna 902. A received voice signal is provided to the speaker 1020 while other received data signals are also processed appropriately.

Additionally, a physical connector 988 can be used to connect the mobile device 900 to an external power source, such as an AC adapter or powered docking station. The physical connector 988 can also be used as a data connection to a computing device and/or various embodiments of the controllers 100 described herein. The data connection allows for operations such as synchronizing mobile device data with the computing data on another device.

A GPS transceiver 965 utilizing satellite-based radio navigation to relay the position of the user applications is enabled for such service.

The example computer systems illustrated in the Figs. include examples of computer readable storage media. Computer readable storage media are also processor readable storage media. Such media may include volatile and non-volatile, removable and non-removable media implemented in any method or technology for storage of information such as computer readable instructions, data structures, program modules or other data. Computer storage media includes, but is not limited to, RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other medium which can be used to store the information and which can accessed by a computer.

Figure 8:
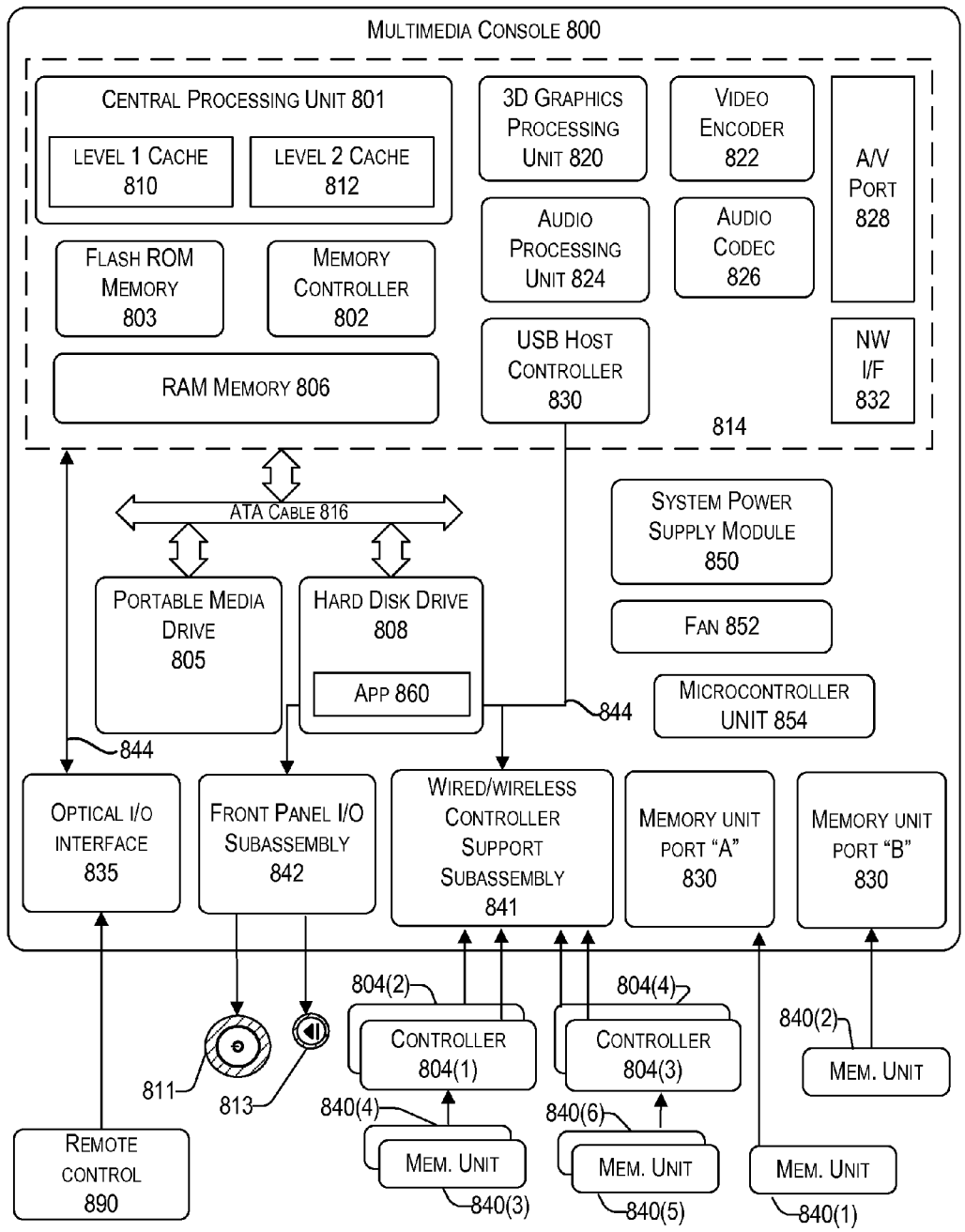
FIG. 8 is a block diagram of an exemplary console device.

FIG. 8 is a block diagram of another embodiment of a computing system that can be used to implement the console 202. In this embodiment, the computing system is a multimedia console 800, such as a gaming console. As shown in FIG. 8, the multimedia console 800 has a central processing unit (CPU) 801, and a memory controller 802 that facilitates processor access to various types of memory, including a flash Read Only Memory (ROM) 803, a Random Access Memory (RAM) 806, a hard disk drive 808, and portable media drive 805. In one implementation, CPU 801 includes a level 1 cache 810 and a level 2 cache 812, to temporarily store data and hence reduce the number of memory access cycles made to the hard drive 808, thereby improving processing speed and throughput.

CPU 801, memory controller 802, and various memory devices are interconnected via one or more buses (not shown). The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, CPU 801, memory controller 802, ROM 803, and RAM 806 are integrated onto a common module 814. In this implementation, ROM 803 is configured as a flash ROM that is connected to memory controller 802 via a PCI bus and a ROM bus (neither of which are shown). RAM 806 is configured as multiple Double Data Rate Synchronous Dynamic RAM (DDR SDRAM) modules that are independently controlled by memory controller 802 via separate buses (not shown). Hard disk drive 808 and portable media drive 805 are shown connected to the memory controller 802 via the PCI bus and an AT Attachment (ATA)

bus 816. However, in other implementations, dedicated data bus structures of different types can also be applied in the alternative.

A graphics processing unit 820 and a video encoder 822 form a video processing pipeline for high speed and high resolution (e.g., High Definition) graphics processing. Data are carried from graphics processing unit (GPU) 820 to video encoder 822 via a digital video bus (not shown). Lightweight messages generated by the system applications (e.g., pop ups) are displayed by using a GPU 820 interrupt to schedule code to render popup into an overlay. The amount of memory used for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resync is eliminated.

An audio processing unit 824 and an audio codec (coder/decoder) 826 form a corresponding audio processing pipeline for multi-channel audio processing of various digital audio formats. Audio data are carried between audio processing unit 824 and audio codec 826 via a communication link (not shown). The video and audio processing pipelines output data to an A/V (audio/video) port 828 for transmission to a television or other display. In the illustrated implementation, video and audio processing components 820-828 are mounted on module 814.

FIG. 8 shows module 814 including a USB host controller 830 and a network interface 832. USB host controller 830 is shown in communication with CPU 801 and memory controller 802 via a bus (e.g., PCI bus) and serves as host for peripheral controllers 804(1)-804(4). Network interface 832 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 7, console 800 includes a controller support subassembly 841 for supporting four controllers 804(1)-804(4). The controller support subassembly 841 includes any hardware and software components to support wired and wireless operation with an external control device, such as for example, a media and game controller. A front panel I/O subassembly 842 supports the multiple functionalities of power button 811, the eject button 813, as well as any LEDs (light emitting diodes) or other indicators exposed on the outer surface of console 802. Subassemblies 841 and 842 are in communication with module 814 via one or more cable assemblies 844. In other implementations, console 800 can include additional controller subassemblies. The illustrated implementation also shows an optical I/O interface 835 that is configured to send and receive signals that can be communicated to module 814.

MUs 840(1) and 840(2) are illustrated as being connectable to MU ports "A" 830(1) and "B" 830(2) respectively. Additional MUs (e.g., MUs 840(3)-840(6)) are illustrated as being connectable to controllers 804(1) and 804(3), i.e., two MUs for each controller. Controllers 804(2) and 804(4) can also be configured to receive MUs (not shown). Each MU 840 offers additional storage on which games, game parameters, and other data may be stored. In some implementations, the other data can include any of a digital game component, an executable gaming application, an instruction set for expanding a gaming application, and a media file. When inserted into console 800 or a controller, MU 840 can be accessed by memory controller 802. A system power supply module 850 provides power to the components of multimedia console 800. A fan 852 cools the circuitry within console 800. A microcontroller unit 854 is also provided.

An application 860 comprising machine instructions is stored on hard disk drive 808. When console 800 is powered on, various portions of application 860 are loaded into RAM 806, and/or caches 810 and 812, for execution on CPU 801, wherein application 860 is one such example. Various applications can be stored on hard disk drive 808 for execution on CPU 801.

Multimedia console 800 may be operated as a standalone system by simply connecting the system to audio/visual device 16, a television, a video projector, or other display device. In this standalone mode, multimedia console 800 enables one or more players to play games, or enjoy digital media, e.g., by watching movies, or listening to music. However, with the integration of broadband connectivity made available through network interface 832, multimedia console 800 may further be operated as a participant in a larger network gaming community.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A content presentation and interaction system, comprising:
    a physical controller communicatively coupled to the content presentation and interaction system, the physical controller configured to provide a set of tactile control inputs in a physical controller format to a software application running on the content presentation and interaction system via a physical controller interface of the content presentation and interaction system, the physical controller including a joystick and one or more other tactile input mechanisms, and the software application supporting the physical controller format of the set of tactile control inputs;
    a target recognition and tracking system communicatively coupled to the content presentation and interaction system, the target recognition and tracking system configured to detect pose information including skeletal data having absolute and relative positions of body joints via a natural user interface (NUI) of the content presentation and interaction system, the pose information having a pose format, different from the physical controller format of the set of tactile control inputs, where the software application does not support the pose format; and
    a gesture and controller application programming interface for receiving the pose information from the target recognition and tracking system, converting the pose information into one or more converted control inputs having the physical controller format, and providing the one or more converted control inputs to the software application as if the converted control inputs had originated via the physical controller interface and not the NUI.

2. The content presentation and interaction system of claim 1, wherein the gesture and controller application programming interface receives the pose information including skeletal data and processes the skeletal data to identify gestural input as a Boolean value compatible with the physical controller format.

3. The content presentation and interaction system of claim 2, wherein the skeletal data processed to identify gestural input as the Boolean value includes a first body part contacting, or not contacting, a second body part.

4. The content presentation and interaction system of claim 1, wherein the gesture and controller application programming interface receives the pose information including skeletal data and processes the skeletal data to identify gestural input as a float value compatible with the physical controller format.

5. The content presentation and interaction system of claim 4, wherein the skeletal data processed to identify gestural input as the float value includes one or more body parts leaning between a neutral position and a maximum extent.

6. The content presentation and interaction system of claim 4, wherein the skeletal data processed to identify gestural input as the float value includes one of the following:
 a. measuring a degree of body tilt,
 b. measuring a degree of body twist,
 c. measuring a degree of bend from the waist,
 d. measuring a degree to which an arm or leg is raised,
 e. measuring speech, and
 f. head rotation about one or more of three perpendicular axes.

7. The content presentation and interaction system of claim 1, wherein the gesture and controller application programming interface receives the pose information including skeletal data and processes the skeletal data to identify gestural input as an action gesture compatible with the physical controller format.

8. The content presentation and interaction system of claim 7, wherein the skeletal data processed to identify gestural input as the action gesture includes measuring positions of one or more body parts over multiple instances of time.

9. The content presentation and interaction system of claim 7, wherein the skeletal data processed to identify gestural input as the action gesture includes detecting vector movement of a body part.

10. A content presentation and interaction system, comprising:
 a physical controller communicatively coupled to the content presentation and interaction system, the physical controller configured to provide a set of tactile control inputs in a physical controller format to a gaming application running on the content presentation and interaction system via a physical controller interface of the content presentation and interaction system, the physical controller including a joystick and one or more other tactile input mechanisms, the gaming application supporting the physical controller format of the set of tactile control inputs, and the set of tactile control inputs including at least one of Boolean and float values compatible with the physical controller format;
 a target recognition and tracking system communicatively coupled to the content presentation and interaction system, the target recognition and tracking system configured to detect pose information including skeletal data having absolute and relative positions of body joints via a natural user interface (NUI) of the content presentation and interaction system, the pose information having a pose format, different from the physical controller format of the set of tactile control inputs, where the gaming application does not support the pose format; and
 a gesture and controller application programming interface (API) for receiving the pose information including skeletal data from the target recognition and tracking system, the API converting the pose information into Boolean inputs compatible with the physical controller format at a first time and float values compatible with the physical controller format at a second time, different than the first time, for use as control inputs to the gaming application as if the Boolean and float inputs had originated via the physical controller interface and not the NUI.

11. The content presentation and interaction system of claim 10, wherein converting the pose information into Boolean inputs compatible with the physical controller format includes identifying, from the skeletal data, a first body part contacting, or not contacting, a second body part.

12. The content presentation and interaction system of claim 10, wherein converting the pose information into the float values compatible with the physical controller format includes identifying, from the skeletal data, one or more body parts leaning between a neutral position and a maximum extent.

13. The content presentation and interaction system of claim 12, wherein the skeletal data includes one of the following:
 a. measuring a degree of body tilt,
 b. measuring a degree of body twist,
 c. measuring a degree of bend from the waist,
 d. measuring a degree to which an arm or leg is raised,
 e. measuring speech, and
 f. head rotation about one or more of three perpendicular axes.

14. The content presentation and interaction system of claim 10, further comprising converting the pose information into an action gesture compatible with the physical controller format.

15. The content presentation and interaction system of claim 14, wherein converting the pose information into the action gesture includes, based on the skeletal data, measuring positions of one or more body parts over multiple instances of time.

16. The content presentation and interaction system of claim 15, wherein the skeletal data includes vector movement of a body part.

17. The content presentation and interaction system of claim 10, wherein the gesture and controller application programming interface includes a library of stored rules defining body positions and/or movements that qualify as predefined gestures.

18. A content presentation and interaction system, comprising:
 a physical controller communicatively coupled to the content presentation and interaction system, the physical controller configured to provide a set of tactile control inputs in a physical controller format to a software application running on the content presentation and interaction system via a physical controller interface of the content presentation and interaction system, the physical controller including a joystick and one or more other tactile input mechanisms, the software application supporting the physical controller format of the set of tactile control inputs, and the set of tactile control inputs including at least one of Boolean and float values;

a target recognition and tracking system communicatively coupled to the content presentation and interaction system, the target recognition and tracking system configured to detect pose information including skeletal data having absolute and relative positions of body joints via a natural user interface (NUI) of the content presentation and interaction system, the pose information having a pose format, different from the physical controller format of the set of tactile control inputs, where the software application does not support the posse format; and a gesture and controller application programming interface for receiving the pose information including skeletal data from the target recognition and tracking system and converting the pose information into control inputs including at least one of Boolean and float values compatible with the physical controller format, the control inputs provided to the software application as at least one of Boolean and float values as if the Boolean and float values had originated via the physical controller interface through user-manipulation of a plurality of tactile input mechanisms and not via the NUI.

19. The content presentation and interaction system of claim 18, wherein converting the pose information into Boolean values includes identifying, from the skeletal data, a first body part contacting, or not contacting, a second body part.

20. The content presentation and interaction system of claim 18, wherein converting the pose information into float values includes identifying, from the skeletal data, one or more body parts leaning between a neutral position and a maximum extent.

* * * * *